Sept. 11, 1945.  W. H. BEARDSLEE  2,384,430
AIRCRAFT GUN INSTALLATION
Filed July 1, 1941  5 Sheets-Sheet 5

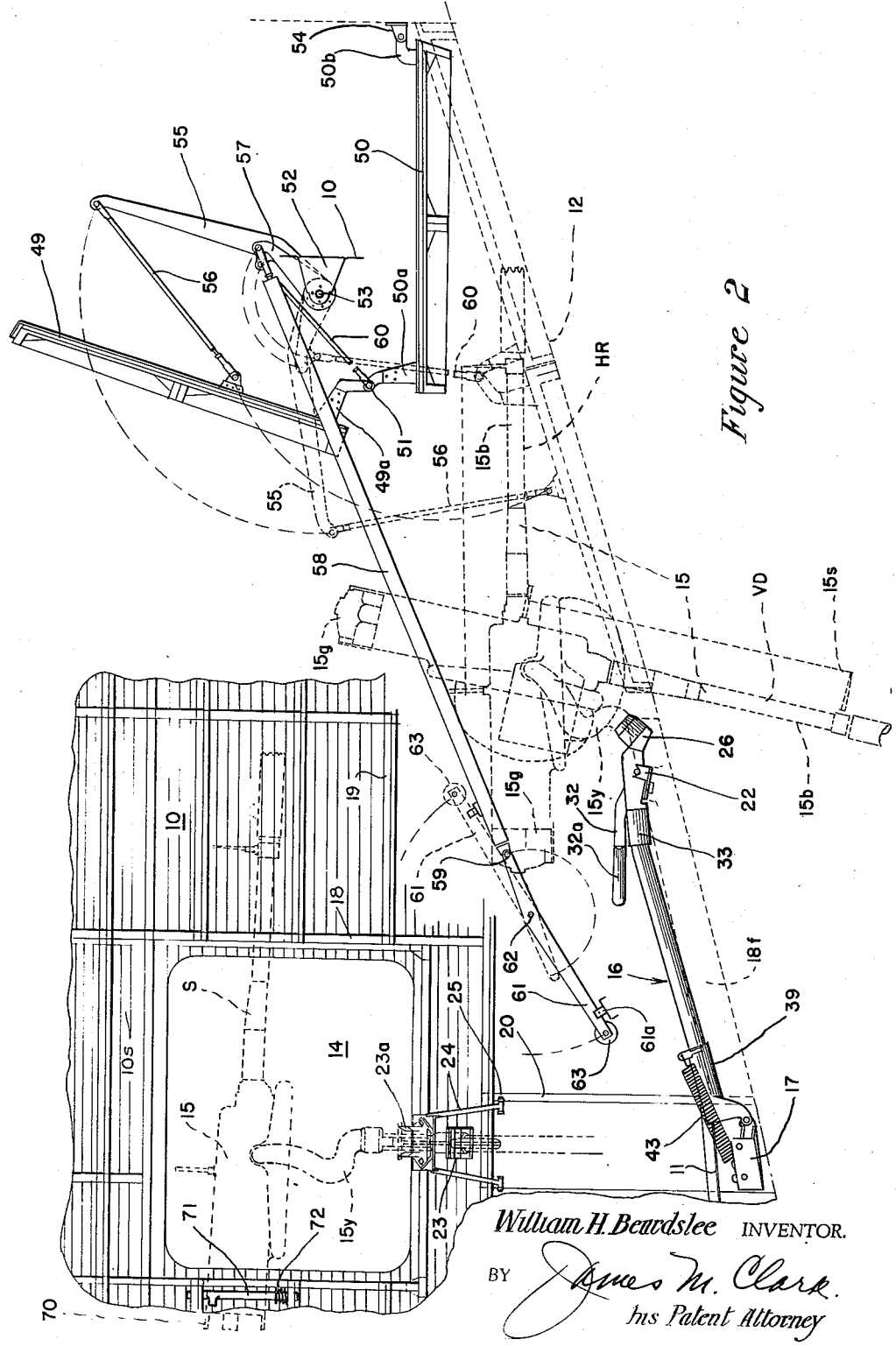

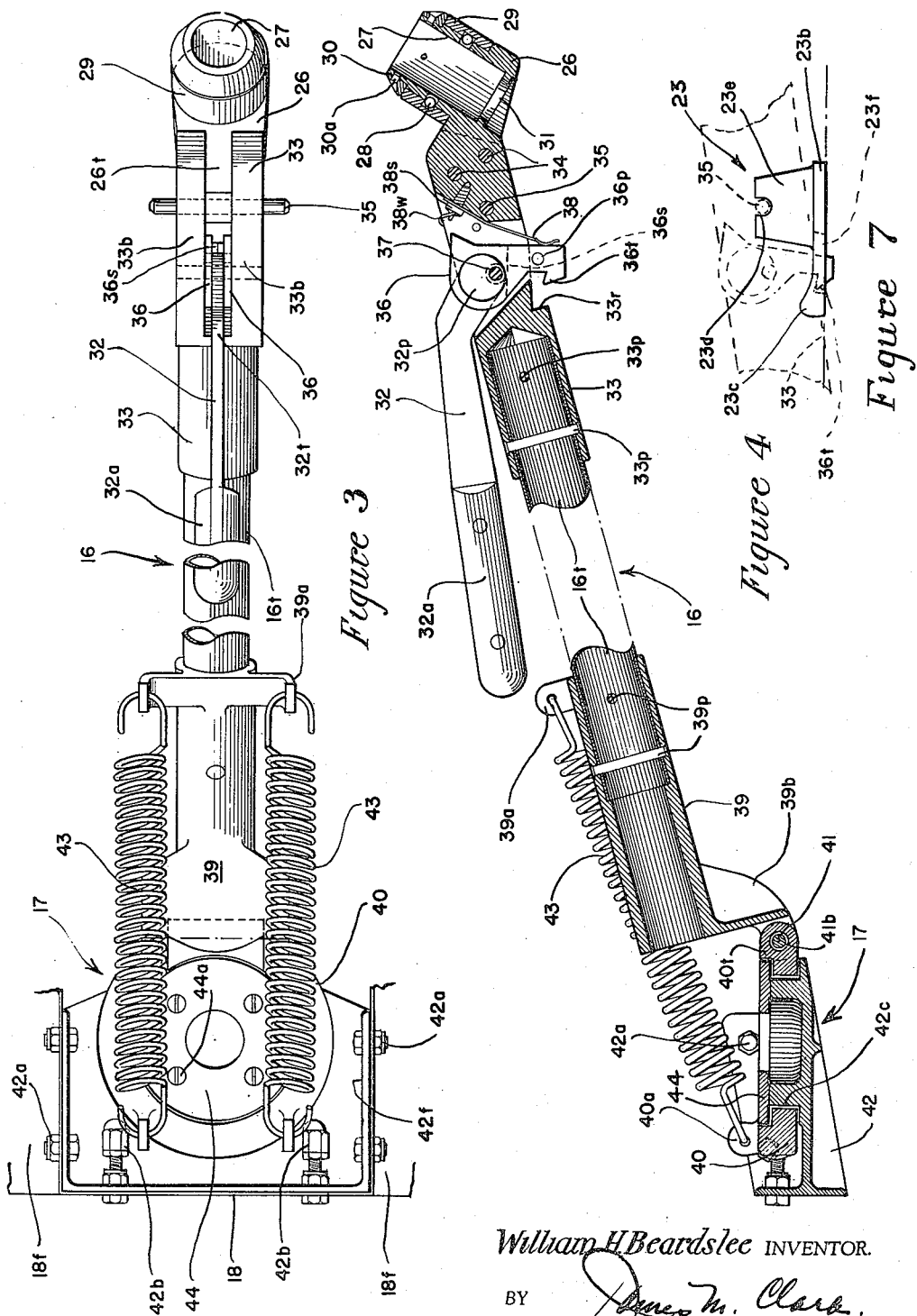

William H. Beardslee INVENTOR.

BY
his Patent Attorney

Patented Sept. 11, 1945

2,384,430

UNITED STATES PATENT OFFICE 2,384,430

AIRCRAFT GUN INSTALLATION

William H. Beardslee, El Segundo, Calif., assignor to North American Aviation, Inc., Inglewood, Calif., a corporation of Delaware Application July 1, 1941, Serial No. 400,587

12 Claims. (Cl. 89—37.5)

This invention relates to gun installations and more particularly to machine gun mounts and gun openings adapted for use in aircraft and other vehicles.

Machine guns are usually either of the "fixed" type in which they are aimed with the vehicle upon which they are fixedly mounted, or they are of the "universally" or "flexibly" mounted type in which the gun may be aimed in any one of numerous directions regardless of the position of the vehicle with respect to the target. The present invention is more particularly directed to guns of the flexibly or universally mounted type.

In combat aircraft it is essential that the range of fire cover attack from as many different points as possible. In large airplanes, this frequently requires the provision of a large number of gun ports through the fuselage or other portions of the airplane and an equally large number of machine guns mounted at each of these ports. The advantages of a large field of fire from a plurality of gun ports in the region of a gunner's station are obtained by the flexible gun mount installation of the present invention while at the same time requiring the use of but one machine gun.

This invention consists essentially of a single strut mount which is pivotally journalled at one terminal to the aircraft and is provided at its free end with a gun socket to receive the machine gun and a quick releasable latching device permitting the free end to be clamped to any one of a plurality of fixed fittings carried upon the aircraft adjacent each of the ports through which it is possible to fire the gun. The gun mount consists further in novel means whereby the overhanging weight of the strut and the gun are counterbalanced to permit the gunner to readily swing the gun and its mount from one gun position to another. The present invention also embraces a novel gun port door and mechanism for opening and closing the same from a position convenient to the gunner. Other features of this invention reside in the novel details of the counterbalanced gun mount and its latching mechanisms for the several firing and stowing positions. It also includes the construction and details of the gun port doors together with the novel arrangement and relationship of all of these elements whereby a more efficient and flexible gunner's station has been obtained.

It is accordingly an object of the present invention to provide a gun position in an aircraft or other vehicle whereby a single machine gun carried upon a counterbalanced mount may be quickly moved from one gun position to another for firing through each of the several gun ports without the necessity of detaching and remounting the gun. It is a further object to provide a novel gun mount which is simple and light in weight and forms a rigid support for a machine gun when latched or fixed in each of its several operating positions. A further object resides in the provision of such a gun mount which is freely pivotable about one of its terminals within a journal fitting attached to the aircraft and counterbalanced such that in moving the gun to another position the overhanging weight of the gun and the mount is compensated by means closely confined to the structure of the mount without interfering with the space required by the gunner.

It is also an object to provide a gun port door constructed in a plurality of sections such that it may be folded and retracted as it is opened and stowed in a position where it does not hinder the movements of the gun or gunner. A still further object resides in the provision of novel hinge and operating mechanisms for the operation of the trap door from a position convenient to the gunner. Other objects and advantages of the present invention will become obvious to those skilled in the art after a reading of the following description and the accompanying drawings forming a part hereof, in which;

Fig. 2 is a side elevation of the gunner's station showing the gun mount latched to the fuselage floor for firing of the machine gun through the opening provided by the folding gun port door;

Fig. 3 is a detailed plan view of the machine gun mount shown in Figs. 1 and 2;

Fig. 4 is a sectional side elevation of the same;

Fig. 7 shows a detail of the gun holding clip;

Figure 1:
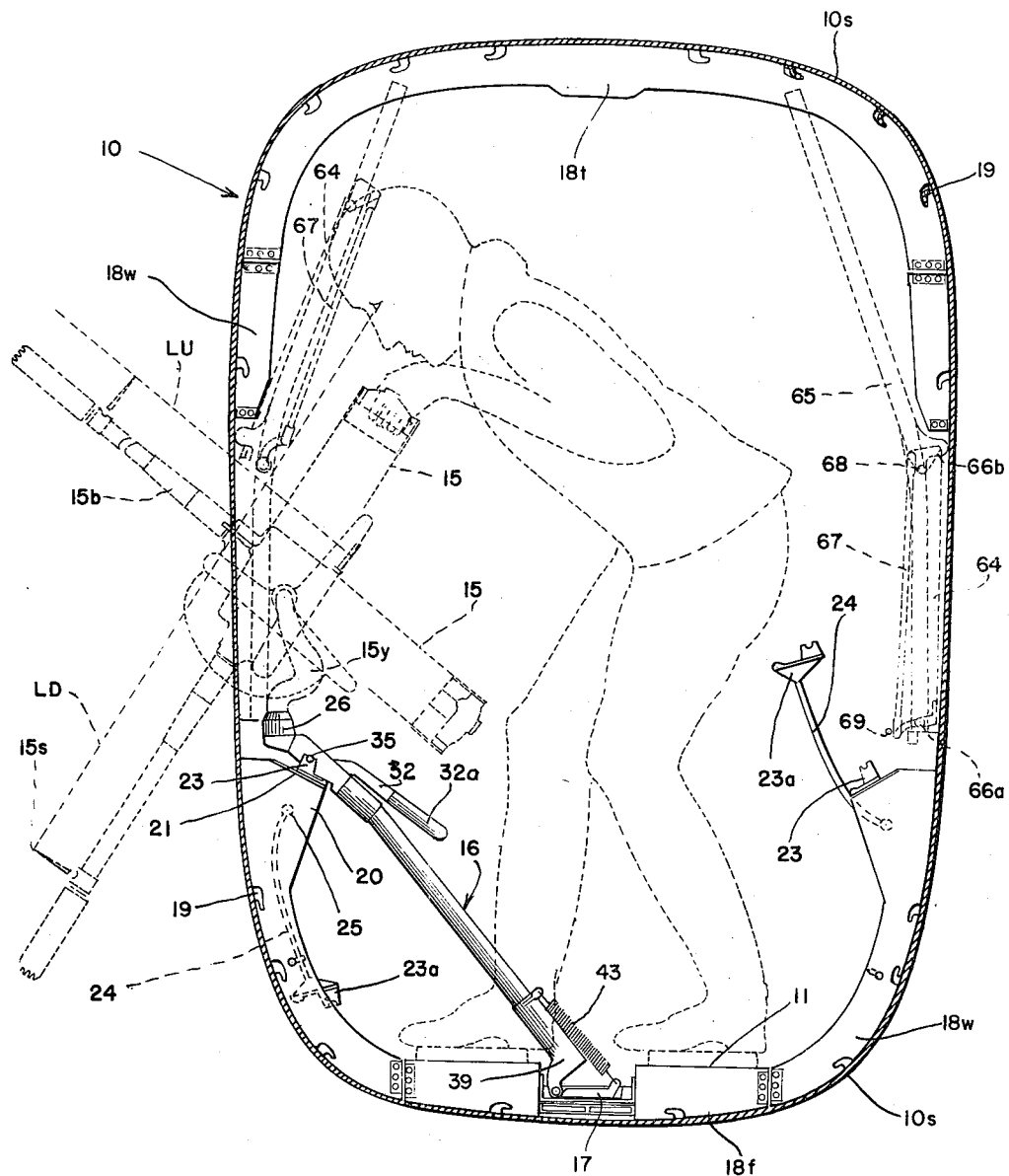
Fig. 1 is a transverse sectional view of an aircraft fuselage showing the gun mount latched in one of its side positions.

Referring now to Figs. 1 and 2 there is shown a portion of an aircraft fuselage 10 having a floor 11 in which is provided a gunner's port 12. The fuselage 10 is formed of a number of transverse bulkhead sections 18 supporting longitudinal stringers 19 and externally covered by the fuselage skin 10S. The bulkhead rings are formed of an upper or top section 18t, two lateral or side wall sections 18w and a floor section 18f having a depressed central portion. Within the wall sections 18w at each side are provided gun ports 13 and 14 disposed opposite each other at the sides of the fuselage. Within the fuselage floor 11 and somewhat aft of the side ports there is provided a floor opening or port 12.

The gun mount 16 is shown in Figs. 1 and 2 at a position from which it is adapted to support a machine gun 15 which can be fired through any of the three openings and quickly shifted from one to the other. The gun mount consists essentially of a single strut assembly 16 which is rotatably mounted by the pivot assembly 17 disposed within the depression of the floor 11 formed by the bulkhead section 18f. The free or swingable end 26 of the mount 16 is adapted to carry a machine gun 15, as shown in the dotted lines, and is also provided with a latching device operated by the handle 32 by which the post is releasably attached at any one of its firing positions. Fig. 1 shows a gunner with the gun 15 trained to fire laterally and downwardly through the side port 13 as indicated by the dotted lines LD.

The bulkhead wall sections 18w are provided immediately beneath the side openings 13 and 14 with bulkhead brackets 20 which have riveted thereto the shelf plates 21. Suitably fastened to the plates 21 are the wall or side clips 23 which are more fully shown in Fig. 7. The clips 23 comprise essentially an integral fitting having a base portion 23b from which extend upwardly two spaced portions 23e provided with an upwardly facing notch 23d at their upper edges. The base of the clip is provided with a strike portion 23c and an adjacent opening 23f. The notch 23d is adapted to receive a laterally extending positioning pin 35 carried by the post assembly 16, and the edge 23c and recess 23f are engaged by the latching portion of the mount which will be hereinafter more fully described. There is also provided adjacent the lower edges of the side openings 13 and 14 stowage clips 23a carried at the ends of the curved arms 24 pivotally mounted at 25 upon the bulkhead brackets 20 as shown in Figs. 1 and 2. The stowage brackets 24 are retractable as indicated to the left of Fig. 1 under the opening 13 and may readily be swung upwardly into its operative position as shown to the right in Fig. 1 when the machine gun is not in use as will be more fully described hereinafter.

The flexibly mounted machine gun 15 may preferably be any one of the standard types, the type shown having been indicated merely to show the operation of the shiftable mount 16. The gun 15 comprises a barrel portion 15b, the sighting system 15s, and is pivotally mounted upon the customary yoke, or stirrup 15y. The latter is provided at its lower extremity with a post or pin which is adapted to be retained and pivotally rotatable within the socket fitting 26 of the gun mount 16. When operations require the use of a gun camera, it may be substituted for the machine gun and carried from one fuselage opening to another in the same manner as desired. In Fig. 1 the machine gun is indicated by the dotted lines LD as firing laterally and downwardly and in the same figure by the dotted lines LU to be trained to fire laterally and upwardly. In Fig. 2 the gun 15 is indicated by the dotted lines HR as firing horizontally and rearwardly and by the dotted lines VD as firing vertically and downwardly. In the latter two positions the mount is retained by attachment to the floor clip 22 which is substantially identical with the above described side clips 23.

Referring now to Figs. 3 and 4 there is shown an enlarged plan and side elevation in section of the shiftable gun mount 16 in substantially the position it occupies in relation to the floor when latched to the floor clip 22. An offset or change in direction of the tube is preferably provided near its outer extremity, although in certain installations this may not be found necessary. At the outer or free end of the gun post assembly 16 there is provided the previously mentioned gun post socket fitting 26, within which is formed the cylindrical socket ring 27 in which the post of the gun stirrup pivots. Within the socket ring portion 27 there is provided an annular space in which the retaining balls 28 are housed. The latter are confined from moving outwardly by a similar but tapering space within the locking ring 29 which is coaxially rotatable about the socket portion 27 and by which the balls 28 may be shifted into either their locking or unlocking positions. The locking ring 29 is held in rotatable engagement by the retainer ring 30 to which it is attached by the rivets 30a. The gun socket fitting 26 is provided with a tongue portion 26t, by which it is attached to the adjacent tube end fitting 33 by means of the assembly pins 34. The socket fitting 26 is also provided adjacent the lower portion of the socket ring 27 with an integral stop or detent ring 31 of somewhat lesser diameter which cooperates with the retainer latching assembly 28—29 to releasably hold the gun stirrup post within the socket fitting 26.

Figure 9:
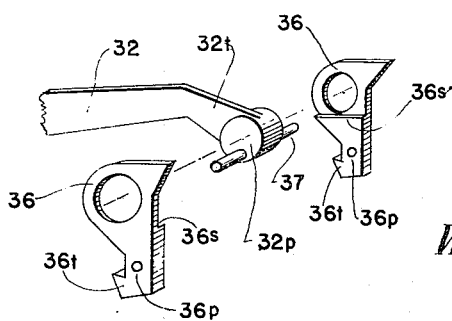
Fig. 9 is an exploded perspective view of latching mechanism of Fig. 4.

The latching mechanism at the free end of the post mount 16 is carried by the outer end fitting 33 which is suitably riveted or pinned to the tube or strut 16t by means of the pins 33p. The fitting 33 is formed with two outwardly extending bifurcated portions 33b between the outer ends of which is retained the above described tongue portion 26t of the socket fitting 26. Extending laterally through the bifurcations 33b and the tongue 26t is a pin 35 which extends outwardly sufficiently to serve as a positioning element and to be seated within the above described notches 23d in the clips 22, 23 and 23a. Between the tongue portion 26t and the inner end of the fitting 33 there is provided a space within which the latching mechanism is pivotally mounted upon the pin 37 and its surrounding bushing. Pivotally mounted upon the pin 37 at each side of the tongue 32t of the handle 32 (see Fig. 9) are two latch elements 36 which are pinned together as a unit by means of the laterally extending pin 36p. The latching elements 36 are similar to but opposite hand with respect to each other in shape. Their outer faces are vertically planar and flush but their inner adjacent faces are recessed to provide a space therebetween for the tongue of the handle 32 which carries the eccentric 32p which is rotatable within the the upper reduced thickness portions of the latch elements 36 above the shoulder 36s formed by the adjacent thickened lower portion of these elements. The latching elements 36 are each provided with a tongue 36t forming an adjacent notch or recess which is adapted together with the recess 33r of the fitting 33 to enter the recess 23f and embrace the strike portion 23c of the clips 22 and 23.

At the inner end of the tongue 26t there is carried a spring 38 by means of the attachment screw 38s and the retaining wire 38w. The spring 38 at its outer extremity is rounded to bear against the back of the latch elements 36 to continually urge the latter into its engaging position with the clips 22 and 23. The handle 32 is provided at its inner extremity with a hand grip portion 32a being pivotally mounted in the fitting 33 by means of the eccentric pin portion 32p which at the same time surrounds the transverse pin and bushing 37. The lower portions of the two halves of the latch elements 36 are substantially twice the thickness of the upper portion which forms the recess for the handle tongue 32t, and the upper surface 36s of the thicker portions is disposed such that upward and outward rotation of the handle 32 will cause opposite but outward rotation of the latch assembly 36 and release of the latching tongue 36t from the clips 22, or 23, as the case may be. Since the pin 32d which is eccentrically mounted with respect to the pivot pin 37, is fixedly attached to the lever 32 and the latch element halves are pivotally mounted upon the eccentric pin 32p, clockwise rotation of the handle 32a through some 120 degrees as viewed in Fig. 4 will impart outward and downward movements of the latch element 36. This movement is caused by the rotation of the upper portion of the eccentric 32p moving from the position shown in Fig. 4 about the center of the pivot 37 into a position appreciably further to the right and slightly lower carrying the latch element 36 therewith, and as also determined by the influence of the spring 38.

The lower or inner end of the tube 16t fits within a socket portion of the lower end or inner terminal fitting 39 to which it is suitably fixed by the pins 39p. This anchored terminal fitting 39 is provided with a bifurcated bracket portion 39b suitably apertured to receive the transverse pin 41 and its bushing 41b. The fitting 39 is also provided with integral apertured ears or lugs 39a to which the hooked terminals of the tension springs 43 are attached. A pivotal support bracket 42 is provided with three flanged sides 42f which closely fit within the floor sections 18f and are attached thereto by means of the fastening bolts 42a. The fitting 42 is also provided with a central cylindrical bearing portion 42c which is rotatably engaged by the rotating ring member 40. The latter is provided with an apertured tongue portion 40t which fits between the bifurcated lugs 39b of the fitting 39, being retained therein by means of the pin 41 and the bushing 41b.

The ring element 40 is in turn retained in rotating contact with the cylindrical bearing portion 42c by means of the retaining ring or collar plate 44 which is fastened thereto by the attachment screws 44a. The rotatable element 40 is provided with spaced apertured ears 40a to which the remaining terminals of the aforementioned springs 43 are hooked. Two of the attachment bolts by which the fitting 42 is fastened to the transverse bulkhead ring 18f, are provided with adjustable stops or nut portions 42b which engage the outer faces of the bifurcated lugs 39b and limit the lateral swinging of the post assembly at the desired points at which the positioning pin 35 will engage the notches 23d of the clips 23 for proper alignment of the latching contact portions 33r and 36t. The pivotal movement of the fitting 40 about its vertical axis and the pivoting of the strut 16 about the axis of the pin 41 which can assume any one of a number of tangential positions with respect to fitting 40, provides a universal pivotal connection for the post mount.

The operation of the swingable post assembly 16 is accomplished quickly and relatively simply. Let us assume that the gunner has the mount 16 latched to the side clip 23 and has been firing laterally and downwardly, as indicated by the dotted figure of the gunner in Fig. 1 and the outline of the gun at LD, and he finds that the target or enemy plane forming his objective has suddenly moved to a position beneath the airplane. By lifting the grip 32a of the handle 32 while holding the spade grip of the machine gun with the other he releases the latch portions 33r and 36t from the clip 23 and the tension in the counterbalance springs 43 assists him in lifting the outer end of the mount 16 to offset the overhanging weight of the gun 15. Accordingly, with relatively little effort the gunner by pulling the gun 15 and the grip 32 toward him can readily bring the gun barrel back into the airplane and at the same time swing the mount 16 rearwardly through substantially 90° as measured in the horizontal plane, and downwardly at the same time, until the mount occupies a fore and aft position close to the floor along the longitudinal axis of the airplane. When this position has been attained it is merely necessary for the gunner to depress both the gun and the free end of the mount until the positioning pins 35 fall within the notches 23d of the floor clip 22 at which position downward pressure upon the latch grip 32a results in locking of the free end of the mount to the clip 22. Inasmuch as the floor port 12 would previously have been opened the gun barrel 15b can readily be swung downwardly through the opening and the sights of the gun again trained on the objective for continued firing.

In order to provide a relatively long gun port for firing through the floor opening 12 a folding closure or trap door of unique construction is provided. This folding door construction is shown in Fig. 2, being a cross-sectional elevation of the fuselage as viewed from its side, and in which the door is shown dotted in its closed position and in full lines in the open position. The door is composed of two sections 49 and 50 which are substantially of equal areas and are arranged in the closed position such that they abut and lie fore and aft of each other in a longitudinal sense. The rear edge of the door section 50 is preferably formed with a somewhat acute angle, and the forward edge of the door section 49 is formed with a correspondingly more obtuse angle, such that in the closed positions these edges lie in transverse planes which are parallel and substantially vertical. The two door sections 49 and 50 are provided at their abutting edges with mounting brackets 49a and 50a which are pivotally connected to each other by means of the hinge or pivot 51. At the rear edge of the door section 50 there are a pair of angularly shaped fittings 50b which are pivoted to the brackets 54 suitably supported upon the aircraft structure. Another pair of brackets 52 is supported from the aircraft structure 10 above the rear section 50 at each side of the fuselage. The brackets 52 are suitably apertured to provide a pivotal journal for the tubular pivot shaft 53.

There is fixedly attached to the shaft 53 a pair of laterally spaced brackets 55, and adjacent one end of the shaft 53 there is attached a considerably shorter lever arm 57. To the outer ends of the arms 55 there are pivotally attached adjustable rods 56 which are in turn pivotally connected to the forward door section 49. The arms 55 are also provided with pivotal connections at a much shorter distance from the axis of the shaft 53, which connections are pivotally joined with the hinge pivots 51 by means of the adjustable rods 60. A push-pull tube 58, which is preferably adjustable in length, is pivotally connected to the outer extremity of the short lever arm 57, the tube 58 extending forwardly and downwardly to a pivotal connection 59 with the lever 61. The latter is pivotally mounted upon the aircraft structure by means of the pivot 62 and is provided at its opposite or free end with a hand grip 63. Suitable latches 61 are provided on the fuselage wall to releasably hold the lever 61 in the open and closed positions of the doors.

Figure 8:
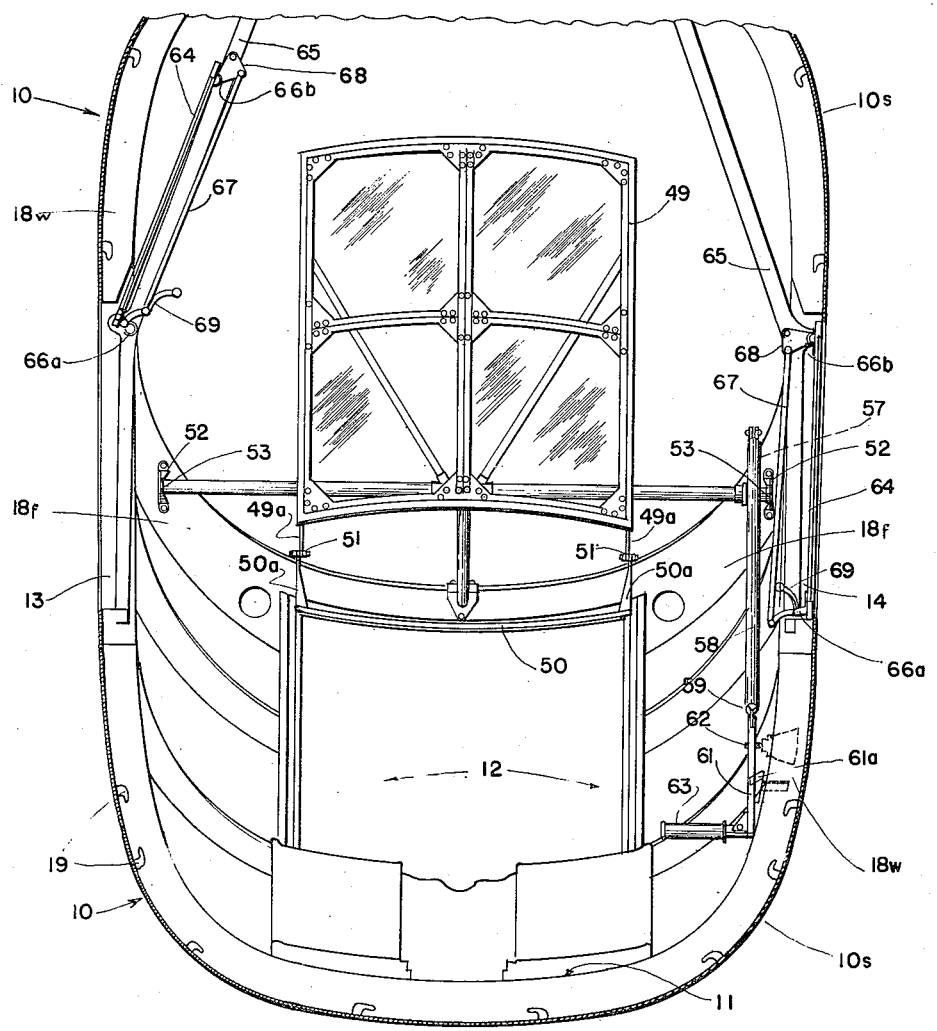
Fig. 8 is a transverse sectional view of the fuselage taken through the sidewall port openings.

The operation of the floor port doors 49 and 50 is as follows: Assuming that the doors are in the open position as indicated by the full lines in Fig. 2 or Fig. 8 and that the gun 15 has been retracted from the opening in the floor or belly of the airplane, the doors are moved into their closed position by the operator lifting hand grip 63 and rotating the hand lever 61 rearwardly about the pivot 62 in a clockwise direction through approximately 180° into the dotted position shown. Such rotation of the hand lever 61 imparts forward and downward movement of the push-pull tube 58 imparting counterclockwise rotation to the pivot shaft 53 and rotation of the levers 55 and 57 through somewhat more than 90° in a forward direction. The entire door assembly comprising the two trap door sections 49 and 50, their intermediate hinges 49a and 50a, and the rods 56 and 60, rotate in a counter-clockwise direction partially about the pivot of the bracket 54 and partially about the axis of the pivot tube 53. Due to the lengths to which the rods 56 and 60 have been adjusted the front door section 49 is moved bodily downwardly and forwardly through a compound movement which includes rotation about the simultaneously moving pivot 51. This concurrent movement of the pivot 51, as determined by the length of the rod 60, causes the rear door section 50 to be rotated into its position about the pivotal connection between the brackets 50b and 54, into its closed or dotted position in which it is aligned with the forward section 49 and forms a smooth or continuously faired exterior surface at this portion of the fuselage.

Figure 5:
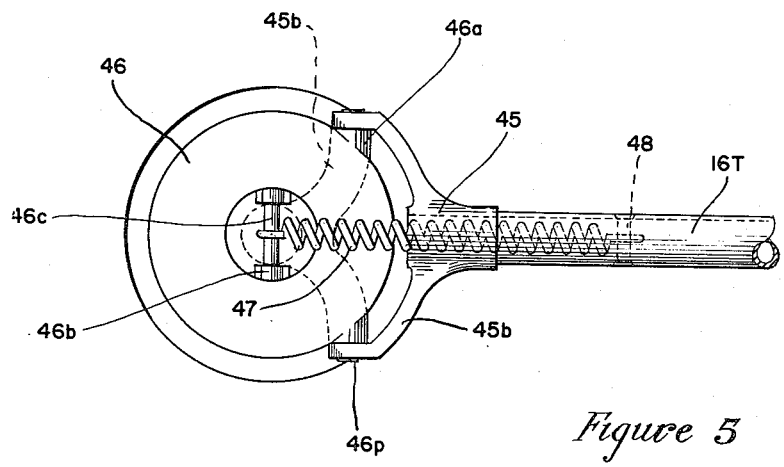
Fig. 5 is a detailed view of the pivoted terminal of a modified form of gun mount.
Figure 6:
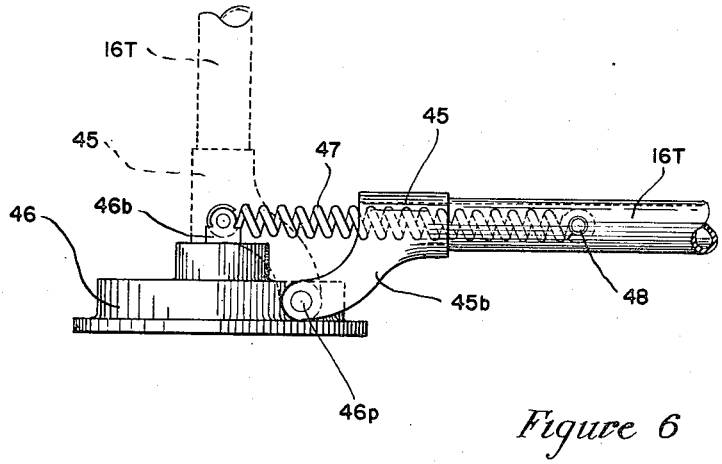
Fig. 6 is a side elevation of the same.

In Figs. 5 and 6 there is shown a preferred modification of the pivotal end of the swingable gun mount. The free end of the mount would of course remain substantially as previously described. In this modification, which has proven exceptionally satisfactory in actual use, a single tension counterbalance spring 47 is anchored by means of the transverse pin 48 concentrically within the mount tube 16T. At the lower extremity of the tube 16T there is suitably fixed a socket fitting 45 provided with bifurcated arms 45b which are suitably apertured to accommodate the transversely extending pins 46p. This modification includes a rotatable fitting 46 which is suitably journalled upon a support fitting of the nature of fitting 42 of Figs. 3 and 4. The rotatable fitting 46 is provided with two spaced lug portions 46b which are suitably bored to receive the transverse pin 46c about which the opposite terminal of the counterbalance spring 47 is anchored. The fitting 46 is also provided with laterally extending boss portions 46a from which the outwardly extending trunnion pins 46p are supported. The construction shown and described in connection with Figs. 5 and 6 has been found to be appreciably lighter and more compact than that previously shown and described with respect to Figs. 3 and 4 and has also provided more clearance and less interference with other objects, including the gunner's feet, adjacent the floor 11 of the fuselage.

Referring again to Figs. 1 and 2, beneath the side port 14 there is shown a stowage support 23a for the gun 15, the support being substantially the same as the previously described wall clip 23 with the exception that it is mounted upon bracket arms 24 pivotally supported by the pin bolts 25 between the bulkhead brackets 26. When it is desired to stow the gun 15 in the position indicated by the dotted lines S in Fig. 2 in which the gun muzzle is pointed downwardly and rearwardly, the auxiliary stowage clip 23a is latched in its upwardly extended position and the spade grip at the breech of the gun is detachably latched by means of the latching assembly 70 mounted upon the vertically pivoted shaft 71 about which is disposed the coil spring 72 which automatically retracts the latch assembly 70—71 into its position against the side wall of the fuselage 10. The stowage clip 23a is shown in its extended position at the right hand side in Fig. 1 and in its retracted or dotted position on the opposite side of the same figure.

In order to protect the gunner and the interior of the fuselage when the side ports 13 and 14 are not in use, sliding closures 64 are provided. Each closure 64 consists of a frame which is suitably glazed with a transparent material and is slidable upwardly along the rollers 66a and 66b into its open position engaging the guides 65 as shown in association with the left hand port 13 of Fig. 8, the rollers 66b at the upper corners of each closure being carried upon a rockable plate 68 which is pivoted to the closure. The rocking or toggle plates 68 are pivotally interconnected by means of the rods 67 with the operating handles 69 such that rotation of the latter, when the closure is in either of its extreme positions, will serve to lock it there due to engagement of the rollers with the detent or offset portions provided in the guides 65.

I have shown in the drawings and described above only preferred forms of the present invention and those other modifications both with respect to general arrangement and details which may occur to those skilled in the art after a reading of this description are all intended to be embraced within the scope and spirit of this invention and as more particularly defined by the appended claims.

I claim:

1. In a gun installation for aircraft, a fuselage having a floor and side walls, openings in the floor and the walls thereof, a gun mount having at least two terminals pivotally supported adjacent one of its terminals upon said fuselage floor, attachment means adjacent each of said fuselage openings, and latching means carried by a remaining free terminal of said gun mount adapted for releasable attachment to either of said attachment means whereby a machine gun carried by said mount may be fired through the adjacent said opening.

2. In a gun installation for aircraft, a fuselage having a floor and side walls, openings in the floor and walls thereof, a gun mount having a plurality of terminals pivotally supported adjacent one of its terminals upon the floor of said fuselage, a machine gun carried upon a remaining free terminal of said mount, attachment means disposed adjacent said fuselage openings, and latching means carried by the said free terminal of said gun mount adapted for releasable attachment to either of said attachment means whereby the said gun mount is fixed to said fuselage and said gun may be fired through the adjacent said opening.

3. In a gun installation for aircraft, a fuselage having a floor and side walls, openings in the floor walls thereof, a gun mount having a free terminal and an attached terminal, said gun mount pivotally supported adjacent one of its terminals upon said fuselage floor intermediate said openings, a machine gun carried adjacent said free terminal of said mount, attachment means carried upon the fuselage disposed adjacent each of said fuselage openings, and latching means carried by the last said terminal of said mount adapted for releasable attachment to either of said attachment means whereby the said gun may be aimed through either of said openings.

4. In a gun installation for aircraft, a fuselage having a floor and side walls, openings in the floor and walls thereof, a gun mount having at least two terminals pivotally supported adjacent one of its said terminals upon said fuselage floor intermediate each of said openings, a machine gun carried upon a remaining free terminal of said mount, attachment means disposed adjacent each of said fuselage openings, latching means carried by the last said terminal of said mount adapted for releasable attachment to either of said attachment means whereby the said gun may be fired through either of said openings, and tension means interconnecting said mount and its pivotal support adapted to counterbalance said gun in the unattached condition of said free terminal.

5. A gun installation for aircraft comprising an aircraft, a fuselage portion of said aircraft having a floor and side walls, openings in the floor and walls thereof, a gun mount having a plurality of terminals pivotally supported adjacent one of its terminals upon a lower portion of said fuselage at a gunner's position forward of said floor openings and intermediate said wall openings, a machine gun carried upon a remaining free terminal of said mount, attachment means disposed adjacent each of said fuselage openings, and latching means carried by the last said terminal of said mount adapted for releasable attachment to either of said attachment means whereby the said gun may be aimed through either of said openings.

6. In a gun installation for aircraft, a fuselage having a floor and side walls, openings in the floor and walls thereof, a gun mount having at least two end portions pivotally supported adjacent one of its end portions upon said fuselage floor intermediate each of said openings, a machine gun carried upon the remaining free end portion of said mount, attachment means disposed upon said floor and walls adjacent each of said fuselage openings equidistant from said pivotal floor support, and latching means carried by the last said end portion of said mount adapted for releasable attachment to either of said attachment means whereby the said gun may be fired through either of said openings.

7. In an aircraft, a gun mount comprising a tubular body portion, a pivotal fitting carried by the aircraft, a ring element rotatably mounted upon said pivotal fitting, an inner terminal of said body portion of said mount pivotally supported upon said ring element to provide universal rotation about axes which are both normal and tangent to the axis of said pivotal fitting, means associated with the opposite terminal of said mount for releasably retaining a machine gun, manual latching means adjacent said latter terminal adapted for its releasable attachment to any one of a plurality of points upon said aircraft and tension means interconnecting said mount and said ring element adapted to counterbalance said gun in the unattached condition of said opposite terminal of said mount.

8. An aircraft gun mount installation comprising an aircraft structure, a tubular body portion, a pivotal fitting carried by said aircraft structure, a ring element engaging said pivotal fitting for relative rotation about the axis thereof, an inner terminal fitting carried by said mount pivotally attached to said pivotal fitting, a gun socket carried by the outer terminal of said mount for releasably retaining a machine gun, manual latching means adjacent said latter terminal adapted for its releasable attachment to either of a plurality of spaced points on said aircraft, and tension means interconnecting said mount and said ring element adapted to counterbalance the weight of said gun in the unattached condition of the outer terminal of said mount.

9. In an aircraft gun mount, an aircraft, a strut, a pivotal fitting carried by said aircraft, a ring fitting rotatably embracing said pivotal fitting, a base portion of said strut pivotally attached to the said ring fitting for universal movements with respect to said aircraft, gun-retaining means associated with an opposed portion of said strut, manual latching means adjacent said latter portion adapted for its releasable attachment to any one of a plurality of separated attachment elements on said aircraft and tension means interconnecting an intermediate portion of said strut and said ring fitting adapted to counterbalance the weight of said mount in its detached condition with respect to said attachment elements on said aircraft.

10. In an aircraft gun mount, an aircraft structure, a base fitting fixedly attached to said aircraft structure having a bearing portion disposed on a primary axis, a ring fitting engaging the bearing portion of said base fitting for relative rotation with respect thereto about said axis, said ring fitting having a pivotal bore disposed normal to and displaced from said primary axis, a gun-carrying strut adapted to pivotally engage said pivotal bore of said ring fitting whereby said gun may be universally moved about and with respect to the primary axis of said base fitting, and resilient means connecting said strut with said ring fitting adapted to counterbalance the weight of said gun.

11. In an aircraft gun mount, an aircraft structure, a base fitting fixedly attached to said aircraft structure having a bearing portion disposed on a substantially vertical axis, a ring fitting engaging the bearing portion of said base fitting for relative rotation with respect thereto about said axis, said ring fitting having a pivotal bore disposed normal to and displaced from said axis, an attachment portion carried by said ring fitting, a gun-carrying strut adapted to pivotally engage said pivotal bore of said ring fitting whereby said gun may be universally moved with respect to said fixed base fitting, and tension means interconnecting said ring attachment portion and said strut whereby the weight of said strut and the gun carried thereby is counterbalanced.

12. In an aircraft, a gun mount, a universally swingable strut having a free terminal and an anchored terminal, said strut adapted to carry a machine gun at its free terminal, a bifurcated fitting at the anchored terminal of said mount, a rotatable element journalled upon said aircraft for rotation about a substantially vertical axis, a hinge pin having a substantially horizontal axis connecting said rotatable element with the bifurcated portion of said terminal fitting adapted to permit pivotal rotation of said gun mount toward and away from said vertical axis and tension means interconnecting said mount and said rotatable element tending to urge said mount toward said vertical axis.

WILLIAM H. BEARDSLEE.